(12) United States Patent
Freson et al.

(10) Patent No.: US 8,388,133 B2
(45) Date of Patent: Mar. 5, 2013

(54) METHOD FOR DETERMINING THE SHAPE OF THE BEVEL OF AN OPHTHALMIC LENS

(75) Inventors: David Freson, Charenton-le-Pont (FR); Frédéric Dubois, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 199 days.

(21) Appl. No.: 12/811,078

(22) PCT Filed: Dec. 23, 2008

(86) PCT No.: PCT/EP2008/068269
§ 371 (c)(1),
(2), (4) Date: Jun. 28, 2010

(87) PCT Pub. No.: WO2009/065963
PCT Pub. Date: May 28, 2009

(65) Prior Publication Data
US 2010/0283968 A1    Nov. 11, 2010

(30) Foreign Application Priority Data

Dec. 28, 2007   (EP) .................................... 07301760

(51) Int. Cl.
*G02C 7/00*    (2006.01)
*G02C 7/02*    (2006.01)
*G02C 13/00*   (2006.01)

(52) U.S. Cl. .................................... 351/178; 351/159.73
(58) Field of Classification Search .................. 351/174, 351/178, 159.73–159.77
See application file for complete search history.

(56) References Cited

U.S. PATENT DOCUMENTS

| | | | |
|---|---|---|---|
| 5,450,335 A * | 9/1995 | Kikuchi | 702/168 |
| 5,790,232 A | 8/1998 | Hagiwara et al. | |
| 6,062,947 A | 5/2000 | Obayashi et al. | |
| 6,813,536 B1 | 11/2004 | Gottschald | |
| 2005/0251280 A1 * | 11/2005 | Shibata | 700/117 |

FOREIGN PATENT DOCUMENTS

| | | |
|---|---|---|
| EP | 0 576 268 | 12/1993 |
| EP | 0 583 915 | 2/1994 |
| EP | 1 591 199 | 11/2005 |
| EP | 1 767 983 | 3/2007 |

\* cited by examiner

Primary Examiner — James Greece
(74) Attorney, Agent, or Firm — Cozen O'Connor

(57) ABSTRACT

A method for determining the shape of the bevel of an ophthalmic lens so as to have the ophthalmic lens fit a given spectacle frame, the method comprising the steps of: providing the three-dimensional (xi, yi, zi) internal profile of the groove of at least a rim of the spectacle frame expressed in the principal axes (Xf, Yf, Zf) of the spectacle frame and the length Pf of the periphery of the groove of the rim, providing the blocking point of the ophthalmic lens and the horizontal direction Xl of the ophthalmic lens, projecting the three-dimensional (xi, yi, zi) internal profile of the groove of the rim on the front face surface of the ophthalmic lens so as to obtain a three-dimension projected groove shape (xp, yp, zp), modifying the coordinates of each point of the two-dimensional groove shape (xp, yp) based on two correction coefficient, Rx for the coordinate xp and Ry for the coordinate yp, with Rx+Ry=1 so as to have the length Pp of the three-dimensional groove projected shape (xp, yp, zp) equal to the length Pf of the periphery of the internal profile of the groove of the rim.

12 Claims, 3 Drawing Sheets

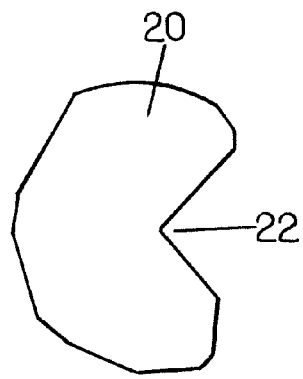
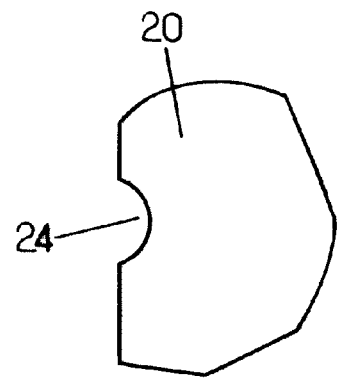
FIG.2a
FIG.2b
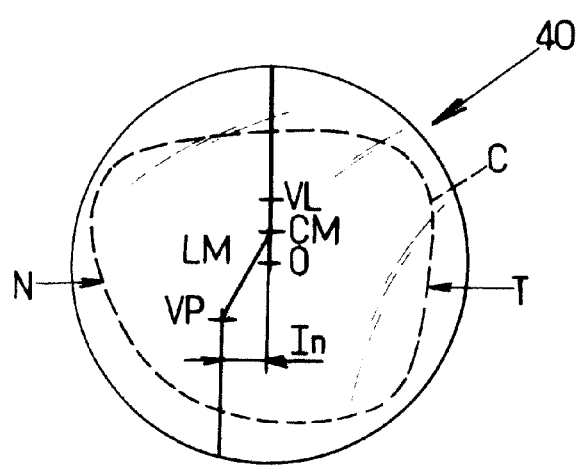
FIG.4.
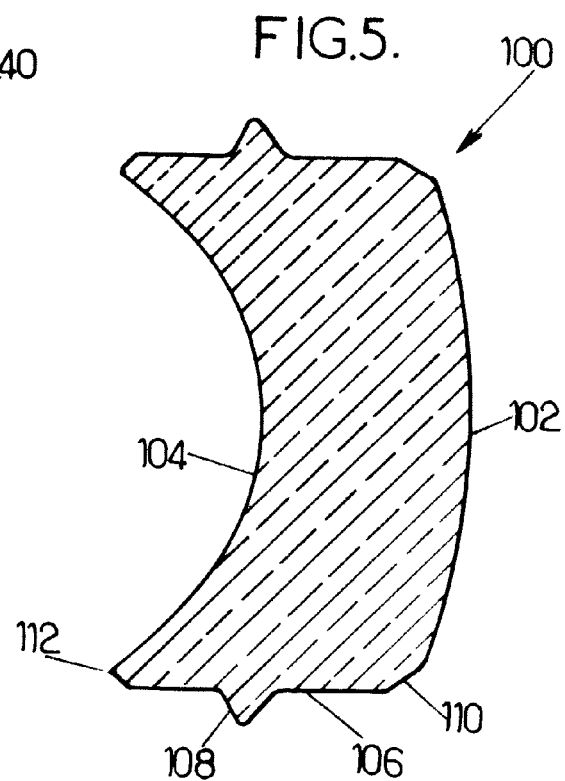
FIG.5.

METHOD FOR DETERMINING THE SHAPE OF THE BEVEL OF AN OPHTHALMIC LENS

RELATED APPLICATIONS

This is a U.S. national stage of application No. PCT/EP2008/068269, filed on Dec. 23, 2008.

This application claims the priority of European application no. 07301760.0 filed Dec. 28, 2007, the entire content of which is hereby incorporated by reference.

FIELD OF THE INVENTION

The invention relates to a method for determining the shape of the bevel of an ophthalmic lens so as to have the ophthalmic lens fit a given spectacle frame.

BACKGROUND OF THE INVENTION

Usually, a person needing to wear spectacles and having thus a prescription filled by an ophthalmologist goes to the premise of an optician for choosing the frame of the future spectacles. The future wearer of the spectacles may try several spectacle frames and finally chooses one of the tried frames. The optician orders a pair of lenses corresponding to the prescription. The lenses sent to the optician have been designed and manufactured according to optical criteria.

Depending on the service provided by the lens manufacturer, the optician may have to cut the lenses to the fit the spectacle frame the person has chosen or in case of "remote edging" service the optician receives the lenses already cut and only has to fit them in the spectacle frame.

The inner circumference of the openings of the chosen spectacle frame (e.g. the openings of the frame where ophthalmic lenses are intended to be mounted, for example the groove of the spectacle frame) can be measured very precisely by a measuring device, for example a mechanical sensor. More particularly, the openings of the frame include an inner groove and the characteristics of the groove (tilt angle with the openings, depth of the groove, etc.) can be measured by the mechanical sensor in a measuring room.

The measurements performed by the mechanical sensor on the chosen spectacle frame make it possible to order ophthalmic lenses which fit the chosen spectacle frame, on the one hand, and the wearer prescription, on the other hand.

According to the measurements performed by the mechanical sensor in the measuring room, the optician or the provider of ophthalmic lenses are able to:

determine the best semi-finished lenses for the wearer according to optical criteria, for example the wearer prescription;

edge and bevel the lenses to fit with the measurements performed on the chosen spectacle frame.

In the sense of the invention the step of cutting the lenses according to a spectacle frame shape includes at least the a step of edging the lens called "edging" step and a step of forming a bevel on an external edged of the lens called "beveling" step.

The lenses provider has to ensure that the provided lenses are adapted to the wearer prescription and to the chosen spectacle frame.

For example, the lenses provider has to ensure that the future lenses can effectively fit the chosen frame which may have particular openings and groove.

It will be thus understood that the measurements performed on the inner circumference openings of the chosen frame, the choice of the semi-finished lens and the calculation of the shape bevel are of great importance to assure a good fitting of the lens in the chosen spectacle frame.

SUMMARY OF THE INVENTION

One object of the present invention is to improve the actual situation, and in particular to increase the number of so called first fit of the cut ophthalmic lens in the chosen spectacle frame.

To this end, the present invention proposes a method for determining the shape of the bevel of an ophthalmic lens so as to have the ophthalmic lens fit a given spectacle frame, the method comprising the steps of:

providing the three-dimensional (xi, yi, zi) internal profile of the groove of at least a rim of the spectacle frame expressed in the principal axes (Xf, Yf, Zf) of the spectacle frame and the length Pf of the periphery of the groove of the rim, providing the blocking point of the ophthalmic lens and the horizontal direction Xl of the ophthalmic lens, aligning the normal Zl to the surface of the ophthalmic lens at the blocking point with the Zf axe of the rim, aligning the horizontal direction Xl of the ophthalmic lens with the Xf axe of the rim, projecting the three-dimensional (xi, yi, zi) internal profile of the groove of the rim on the front face surface of the ophthalmic lens so as to obtain a three-dimension projected groove shape (xp, yp, zp), modifying the coordinates of each point of the two-dimensional groove shape (xp, yp) based on two correction coefficient, Rx for the coordinate xp and Ry for the coordinate yp, with Rx+Ry=1 so as to have the length Pp of the three-dimensional groove projected shape (xp, yp, zp) equal to the length Pf of the periphery of the internal profile of the groove of the rim so as to obtain the shape of the bevel of the ophthalmic lens.

Advantageously, the method according to the invention improves the calculation of the shape of the bevel. Indeed, when the curvature of the shape of the groove is different from the curvature of the front face of the ophthalmic lens selected by the manufacturer, it is advantageous to adapt the shape of the bevel.

It will be thus understood that, on the contrary of the prior art approach, the chosen frame is an input data of the method, while the suitable lens is an output data.

Therefore, the future wearer may choose the best looking frame and the lens provider or the optician are able fit lenses with the wearer prescription in the chosen frame.

According to further embodiments which can be considered alone or in combination:

the correction coefficient RX is different than the correction coefficient RY;

the spectacle frame is a closed rim spectacle frame;

the spectacle frame is a semi-rimless spectacle frame.

According to another aspect, the invention relates to a method of cutting an ophthalmic lens the steps of:

receiving a ophthalmic lens, receiving the three-dimensional (xi, yi, zi) internal profile the groove of at least one rim of the spectacle frame expressed in the principal axes of inertia (Xf, Yf, Zf) of the at least one rim and the length Pf of the periphery of the groove of the at least one rim of the spectacle frame, receiving the blocking point of the ophthalmic lens and the horizontal direction Xl of the ophthalmic lens, determining the shape of the bevel of the ophthalmic lens using a method according an embodiment of the invention, cutting the ophthalmic lens according to the calculated bevel.

According to further embodiments which can be considered alone or in combination:

the spectacle frame is selected and measured at a lens order side and the internal profile of the groove of the spectacle frame is transmitted to a computing device installed at a lens edger side where the calculation steps are processed;

the cutting step is preceded at the order side.

The invention also relates to an ophthalmic lens ordering method comprising the steps of:

selecting a spectacle frame,
ordering an ophthalmic lens cut according to the invention,
fitting the cut ophthalmic lens in the selected spectacle frame.

The ordering method may further comprise an edging step of the ophthalmic lens done at the order side.

According to another aspect, the invention relates to a computer program product comprising one or more stored sequence of instruction that is accessible to a processor and which, when executed by the processor, causes the processor to carry out at least one of the steps of at least one of the method according to the invention.

The invention also relates to a computer readable medium carrying one or more sequences of instructions of the computer program according to the invention.

Unless specifically stated otherwise, the cross-section of a rim of a spectacle frame is to be understood as according to a plane comprising the barycentric center of the rim of the spectacle frame.

Unless specifically stated otherwise, the cross-section of an ophthalmic lens is to be understood as according to a plane comprising the barycentric center of the ophthalmic lens.

Unless specifically stated otherwise, the wording "optician" is to be understood as well as eye care professional.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Non limiting embodiments of the invention will now be described with reference to the accompanying drawings wherein:

FIGS. 2a and 2b are cross-sections of two type of spectacle frames rims;
FIG. 4 represents the contour of a progressive additional lens, before and after edging;
FIG. 5 represents a cross section of an ophthalmic lens edged to fit a closed frame rim.

DETAILED DESCRIPTION OF THE DRAWINGS

Figure 1:
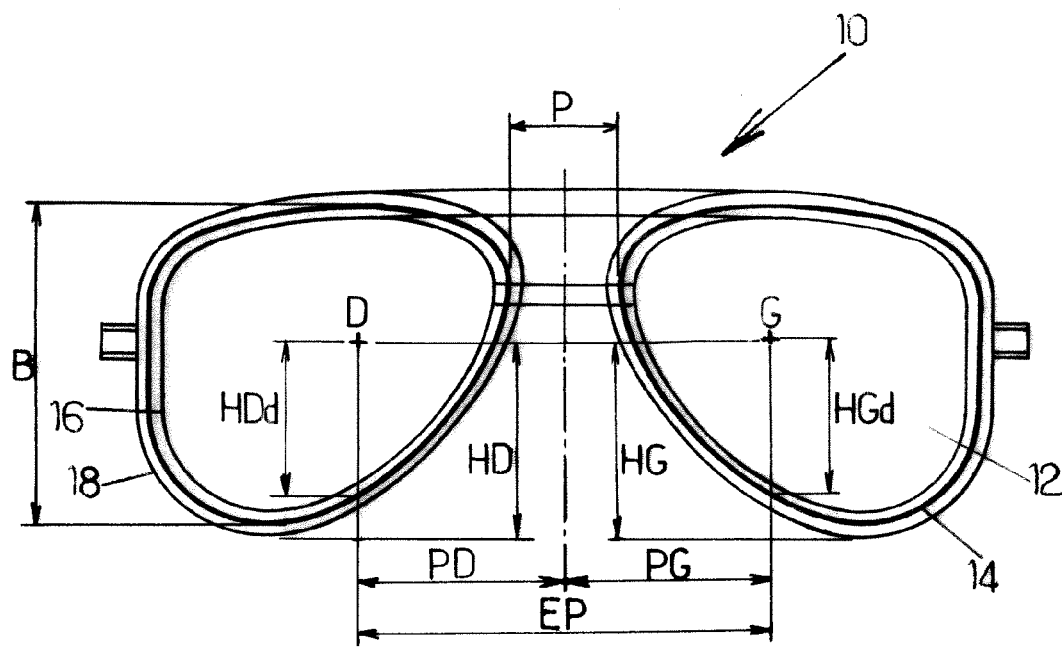
FIG. 1 is the front face of a closed rim spectacle frame.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the framework of the invention, the following terms have the meanings indicated herein below:

optical axis of the addition lens: direction perpendicular to the front face of the lens and passing through the optical centre of the latter;

distance-vision region: region of the lens that surrounds the distance-vision point, and within which the local optical characteristics of optical power and of astigmatism of the lens are substantially identical to those at the distance-vision point;

near-vision region: region of the lens that surrounds the near-vision point, and within which the local optical characteristics of optical power and of astigmatism of the lens are substantially identical to those of the near-vision point;

addition of a progressive lens: difference between the value of optical power of the lens at the near-vision point and that at the distance-vision point;

optical characteristics of a lens: data on optical power, astigmatism, aberration, etc., relating to the modifications of a light beam that passes through the lens;

prescription: set of optical characteristics of optical power, of astigmatism and, where relevant, of addition, determined by an ophthalmologist in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription for a progressive lens comprises values of optical power and of astigmatism at the distance-vision point and, where appropriate, an addition value;

surface characteristics of a lens: geometrical data relating to one face of the lens, such as values of average sphere or of cylinder, for example;

average sphere, denoted D: (N−1) times the half-sum of the inverses of the two radii of curvature of a surface expressed in meter, denoted R1 and R2, and determined at the same point on the latter. In other words: $D=(N-1)\times(1/R1/1-1/R2)/2$, where N is the index of refraction of the lens, and cylinder, denoted C: (N−1) times the absolute value of the half-difference of the inverses of the two radii of curvature of a surface expressed in meter, determined at the same point on the latter. In other words: $C=(N-1)\times|1/R1-1/R2|$;

"height" is used to define a lens or a lens zone dimension corresponding to a vertical when the sight is horizontal;

"width" is used to define a lens or a lens zone dimension corresponding to a horizontal when the sight is horizontal.

In the framework of the invention, the term "curvature" of an optical surface is the curvature in a zone or at a specific point of said surface. If the surface is spherical, the curvature is constant and can be determined everywhere. If the surface is a single vision aspheric surface, its curvature is usually measured or determined at the optical center. If the surface is a progressive addition surface, its curvature is usually measured or determined at the distance-vision point. The here above mentioned points are preferred but not limiting points where a curvature according to the present invention can be measured or determined.

In the sense of the invention, the final ophthalmic lens may be of any type of known lens, for example uncoloured lens or photochromic lens or solar lens.

In the sense of the invention, the geometrical data include at least contour and shape data.

The contour data may be chosen from, but not limited to, the list comprising:
 3 D perimeter of one of the face of the spectacle frame or of the bottom of the groove,
 the distance in at least one point between the groove bottom and one of the faces of the spectacle frame.

The shape data may be chosen from, but not limited to, the list comprising:
 the tangent at the surface of the front face of the spectacle frame,
 a 3D digital representation of the spectacle frame,
 the average tore, sphere, cylinder of the front face of the spectacle frame,
 the dihedral angle,
 the 3D digital representation of the interior profile of the spectacle frame,
 the tilt angle of the spectacle frame.

According to the invention, the geometrical data can be obtained by measuring a given spectacle frame using a measuring device well known in the art. Advantageously, the accuracy of the geometrical data is improved. Indeed, although the spectacle frames are produced based on a reference frame, small geometrical differences may exist between a given frame and the reference frame.

The geometrical data can also be obtained from a spectacle frame data base. Advantageously such method is less time consuming.

The geometrical data may also be obtained by a combination of measurements and use of a data base.

According to different embodiment of the invention, the geometrical data may comprise, but is not limited to:
 actual contour parameters and a reference shape,
 3 dimensional data of the spectacle frame,
 2 dimensional data of the spectacle frame and curve data of the spectacle frame,
 an internal profile data of the rim of the spectacle frame,
 geometrical data of the front face of the spectacle frame.

According to the invention, the wearer data comprise at least the wearer prescription data, and may also comprise elements chosen from, but not limited to, the list comprising:
 monocular PD,
 fitting point height,
 the pantoscopic angle,
 the choice of an esthetic criteria, for example: "1:1", "1:2", "Front curve tracing".

The "front curve tracing" is a criterion in which the bevel is formed so as to adjoin the front surface of the lens with the front surface of the spectacle frame.

The "1:1" is a criterion in which the bevel is formed on the external edge of the ophthalmic lens at equidistance of the front and rear face of the ophthalmic lens.

The "1:2" is a criterion in which the bevel is formed on the external edge of the ophthalmic lens so as to have the distance between the bevel and the front face of the lens equal to ½ of the distance between the bevel and the rear face of the lens.

According to the invention, the prescription data may include little or no vision correction. For example, when the ophthalmic lens is a solar lens, the prescription may comprise no vision correction.

FIG. 1 shows a representation of a spectacle frame 10 and the position of the right and left pupils of the wearer in the spectacle frame 10, which are respectively referenced D and G.

The figure shows for the frame 10 the contour of the lens in thick lines 14, and in thin lines the internal 16 and external 18 limits of the spectacle frame 10.

An element, made of plastic or another material, the contour of which corresponds to the bottom of the groove of the spectacle frame, is called the template of the spectacle frame. The template is therefore the external shape that the lens must have once cut out in order to fit in the frame spectacle.

The letter B designates the total height of the template determined with the Boxing system, i.e. according to the IS08624 standard on systems for the measurement of lenses frames. This height corresponds to the height of a rectangle into which the lens fits once it is cut out.

An element connecting the right and left templates of the frame is called the bridge of the spectacle frame, referenced by letter P in FIG. 1.

The right interpupillary half-distance PD and the left interpupillary half-distance PG refer approximately to half of the distance between the two pupils of the wearer. For the fitting of progressive lenses, an optician measures both interpupillary half-distance PD and PG.

The left half-distance, respectively right, is the distance between the vertical axis of symmetry of the frame and the centre of the left pupil, respectively right.

Right boxing height HD, respectively left boxing height HG, refers to the vertical distance between the right pupil, respectively left and the lowest point of the right half-frame, respectively left height.

For the fitting of progressive lenses, the optician may measure the DATUM heights referenced HDd and HGd in FIG. 1. These right and left reference heights are respectively the distances between the right or left pupil and the right or left intersection between a vertical line passing through the pupil and the frame in its lower part.

The measurements of interpupillary distance and of height of the pupil relative to the frame are carried out for a given position of the wearer, namely for the wearer looking at infinity with his head straight.

The features of a given frame can be measured on the frame, using a device known in the art. For example, U.S. Pat. No. 5,333,412 describes a device which makes it possible to measure in 3-dimensions, the shape of the bottom of the groove of the frame. The shape thus determined then makes it possible to calculate the height B.

The features of a frame can also be given directly by the manufacturer according to the model chosen by the wearer.

Using the data thus defined, each lens is cut out such that the fitting cross CM of a PROGRESSIVE LENS is situated in the frame facing the pupil of the corresponding eye, when the wearer looks at infinity with his head straight.

Consequently, when the wearer of the frame looks at infinity with his head straight, his viewing passes through the lens at the fitting cross. It is of course possible, if the fitting cross is not marked on the lens, to use the medium of the micro-marks for positioning the lenses, after correction by the distance between this medium and the fitting cross.

Unless specifically stated otherwise, the method according to the invention may apply to any type of spectacle frame, for example metal frames, plastic frames, combination frames, semi-rimless frames, Nylor frames, rimless.

FIGS. 2a and 2b show cross sections of two different rims of spectacle frames.

The rim 20 on FIG. 2a has a V-shaped groove 22, usually corresponding to metal or plastic closed spectacle frame. The lens to be fitted in such closed spectacle frame is beveled so as to have a corresponding Λ-shaped bevel (inverse V shape).

The rim 20 on FIG. 2b has a U-shaped groove 24, usually corresponding to semi-rimless spectacle frame. The lens to be fitted in such semi-rimless spectacle frame is beveled so as to have a corresponding U-shaped bevel and then fitted in the spectacle frame using a retaining cord.

Figure 3:
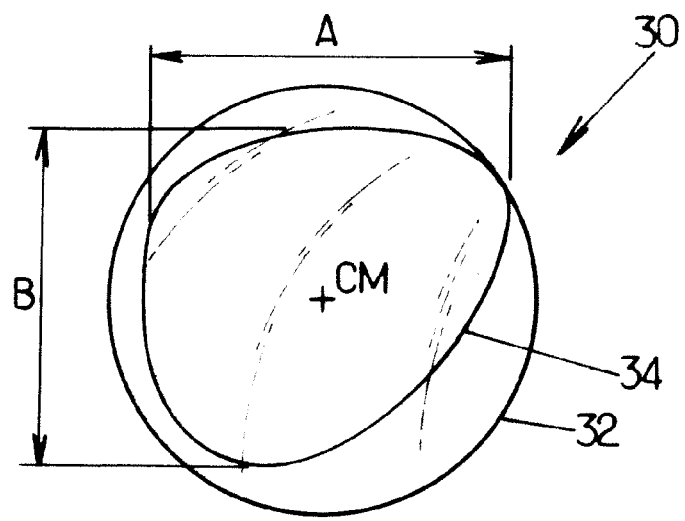
FIG. 3 represents the contour of an ophthalmic lens, before and after edging.

FIG. 3 shows a representation of the contour of an ophthalmic lens, before and after edging. In the figure, the thin line corresponds to the contour of the lens before edging; in a standard manner, the lens has a circular shape. The thick line corresponds to the contour of the template of the frame, which is also the contour of the lens after edging the lens. This edging of the lens followed or combined with a beveling step allows the subsequent fitting of the lens in the spectacle frame.

FIG. 3 shows the total width A of the template of the frame and the total height B of this template, i.e. the width and the height of the rectangle into which the cut-out lens fits. As explained above, the positioning of the lens in the frame consists in determining the desired position of the lens in the frame, using positioning data, for example notable points of the lens.

For example, the fitting cross of the lens, the medium of micro-marks marked on the surface of the lens, or also the optical centre in the case of a single vision lens can be used. In FIG. 3, the fitting cross or optical center is marked by the cross referenced CM.

For a lens which does not have a rotational symmetry, it is also necessary to carry out an angular positioning of the lens in the frame.

FIG. 4 shows schematically an addition lens, before the latter has been edged around a contour C to the dimensions of a frame. In the figure, the nasal and temporal sides of the lens, respectively denoted N and T, the meridian line LM, the distance-vision and near-vision points, respectively denoted VL and VP, the inset In, and an prism reference point (PRP) of the lens, denoted O, are indicated.

FIG. 5 shows a cross section of an edged and beveled ophthalmic lens 100. Such ophthalmic lens presents a front face 102, a rear face 104 and an external periphery 106.

The rear face 104 is the face the closest to the eye of the wearer when the ophthalmic lens is fitted on the frame. Usually the rear face 104 is concave and the front face 102 is convex.

The external periphery 106 is preceded during the edging and beveling steps. As represented on FIG. 5 the external periphery presents fitting means, in this case a bevel 108. As discussed previously, the geometry of the bevel, in particular its position and shape, depends on the spectacle frame in which the ophthalmic lens is to be fitted.

Optionally, the external periphery of the lens can present a front face counter bevel 110 and a rear face counter bevel 112.

Figure 6:
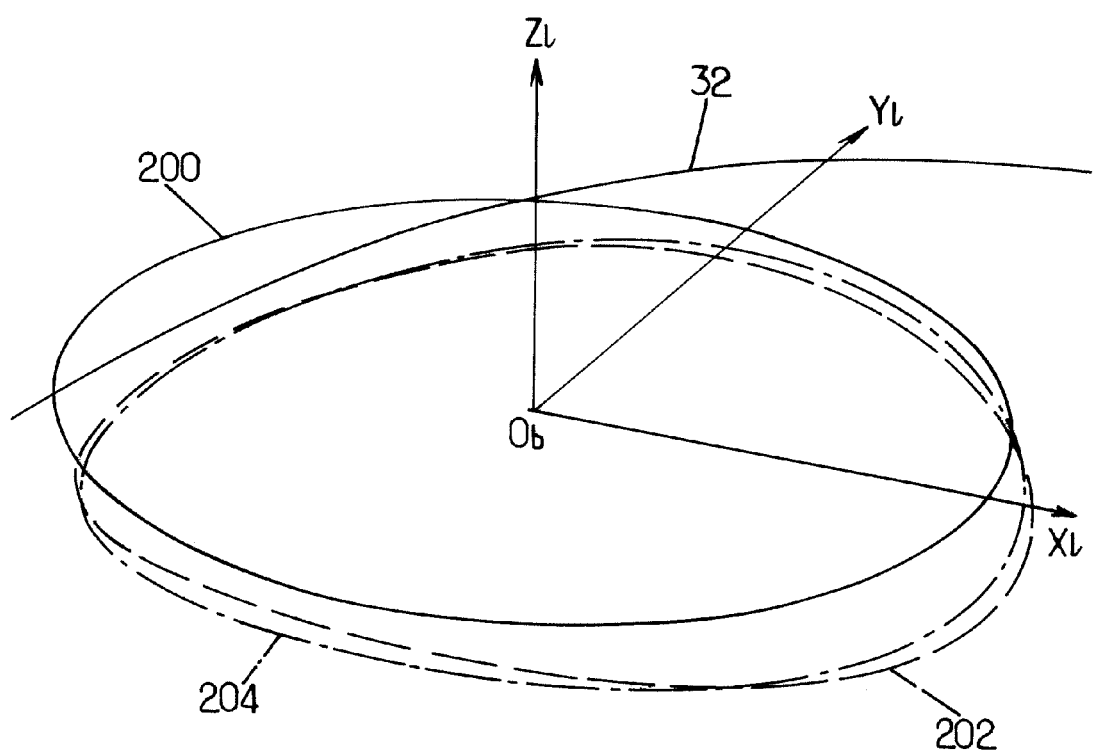
FIG. 6 represents the internal profiles of the groove of a rim during the different steps of the method according to an embodiment of the invention.

An embodiment of the method according to the invention is hereafter described in reference to FIG. 6.

According to an embodiment of the invention the wearer chose a spectacle frame at the optician side.

The optician measures the chosen spectacle frame using a measuring device as describe for example in U.S. Pat. No. 5,121,548.

The measuring data includes at least the internal profile 200 of the groove of each rim of the spectacle frame.

The internal profile 200 of the groove of a rim may be an orthogonal coordinate data file (xi, yi, zi). The internal profile coordinates may be expressed in the principal axes of inertia of the rim (Xf, Yf, Zf) wherein the Xf axis coincides with a datum line or horizontal reference axis of the rim, the Y axis coincides with the vertical direction of the rim, the Z axis coincides with a line perpendicular to the front of the rim and the origin O of the axes may be the geometrical center or the barycenter of the rim.

The length Pf of the periphery of the groove of the rim may be calculated based on the orthogonal coordinates (Xn, Yn, Zn) (n=1, 2, . . . , N) representing the three-dimensional internal profile of the groove of the rim. The length Pf of the periphery of the groove of the rim, which is the length of the periphery of the reproduced three-dimensional shape of the groove of the rim, is calculated according to the following equation:

$$Pf = \sum_{i=1}^{N} [[X_i - X_{i+1}]^2 + [Y_i - Y_{i+1}]^2 + [Z_i - Z_{i+1}]^2]^{1/2}$$

In the equation, when i=N, "1" is used for (i+1).

A blocking point $O_b$ of the ophthalmic lens is calculated according to optical measurements. The blocking point is chosen as the origin of the axes (Xl, Yl, Zl) of the ophthalmic lens.

The Zl axe is the normal to the front face surface of the ophthalmic lens at the blocking point.

According to an embodiment of the invention the principal axes (Xf, Yf, Zf) of the rim are aligned with the axes (Xl, Yl, Zl) of the ophthalmic lens. The orthogonal coordinates (Xn, Yn, Zn) (n=1, 2, . . . , N) of the internal profile of the groove of the rim is re-expressed in the realigned axes and projected on the front surface of the ophthalmic lens.

The next step of the method of the invention is to modifying the projected coordinates 202 of each point of the two-dimensional groove shape (xp, yp) based on two correction coefficient, Rx for the coordinate xp and Ry for the coordinate yp, with Rx+Ry=1 so as to have the length Pp of the three-dimensional groove projected shape 204 (xp, yp, zp) equal to the length Pf of the periphery of the internal profile of the groove of the rim so as to obtain the shape of the bevel of the ophthalmic lens.

The projected coordinates may be modified using iterations steps. The iterations steps may be:

$$X_{k+1} = X_k \times \left(1 + R_x \times \left[\frac{P_f - P_p}{P_f}\right]\right)$$

$$Y_{k+1} = Y_k \times \left(1 + R_y \times \left[\frac{P_f - P_p}{P_f}\right]\right)$$

The choice of the values of the correction coefficient Rx and Ry allows adapting the correction of the shape of the bevel according to the spectacle frame and the ophthalmic lens.

For example, as illustrated on FIG. 6, when the curvature of the front base of the ophthalmic lens is greater than the curvature of the internal profile of the groove of the rim of the spectacle frame, it may be interesting that Rx and Ry be chosen so as to have the coordinate along the Y axe increase and the coordinates along the X axe decrease, for example Rx=3 and Ry=−2.

Indeed, the inventors have observed that the fitting of the ophthalmic lens in the rim of the spectacle frame is then stronger and that the stress is then better distributed around the rim when the ophthalmic lens is fitted.

For example, when the curvature of the front base of the ophthalmic lens is smaller than the curvature of the internal profile of the groove of the rim of the spectacle frame, it may be interesting that Ry be equal to Rx.

Indeed, the inventors have observed that the fitting of the ophthalmic lens in the rim of the spectacle frame is then stronger.

The invention has been described above with the aid of an embodiment without limitation of the general inventive concept.

The invention claimed is:

1. A method for determining the shape of the bevel of an ophthalmic lens so as to have the ophthalmic lens fit a given spectacle frame, the method comprising the steps of:
providing the three-dimensional (xi, yi, zi) internal profile of the groove of at least a rim of the spectacle frame expressed in the principal axes (Xf, Yf, Zf) of the spectacle frame and the length Pf of the periphery of the groove of the rim;
providing the blocking point of the ophthalmic lens and the horizontal direction Xl of the ophthalmic lens;
aligning the normal Zl to the surface of the ophthalmic lens at the blocking point with the Zf axe of the rim;
aligning the horizontal direction Xl of the ophthalmic lens with the Xf axe of the rim;
projecting the three-dimensional (xi, yi, zi) internal profile of the groove of the rim on the front face surface of the ophthalmic lens so as to obtain a three-dimension projected groove shape (xp, yp, zp); and
modifying the coordinates of each point of the two-dimensional groove shape (xp, yp) based on two correction coefficients, Rx for the coordinate xp and Ry for the coordinate yp, with Rx+Ry=1 so as to have the length Pp of the three-dimensional groove projected shape (xp, yp, zp) equal to the length Pf of the periphery of the internal profile of the groove of the rim so as to obtain the shape of the bevel of the ophthalmic lens.

2. The method according to claim 1, wherein the correction coefficient RX is different than the correction coefficient RY.

3. The method according to claim 1, wherein the spectacle frame is a closed rim spectacle frame.

4. The method according to claim 1, wherein the spectacle frame is a semi-rimless spectacle frame.

5. An ophthalmic lens cutting method comprising the steps of:
receiving a ophthalmic lens,
receiving the three-dimensional (xi, yi, zi) internal profile the groove of at least one rim of the spectacle frame expressed in the principal axes of inertia (Xf, Yf, Zf) of the at least one rim and the length Pf of the periphery of the groove of the at least one rim of the spectacle frame,
receiving the blocking point of the ophthalmic lens and the horizontal direction Xl of the ophthalmic lens,
determining the shape of the bevel of the ophthalmic lens using a method according to claim 1, and
cutting the ophthalmic lens according to the calculated bevel.

6. The method according to claim 5, wherein the spectacle frame is selected and measured at a lens order side and the internal profile of the groove of the spectacle frame is transmitted to a computing device installed at a lens edger side where the calculation steps are processed.

7. The method according to claim 5, wherein the cutting step is preceded at the order side.

8. An ophthalmic lens ordering method comprising the steps of:
selecting a spectacle frame,
ordering an ophthalmic lens cut according to claim 5 and,
fitting the cut ophthalmic lens in the selected spectacle frame.

9. A non-transitory computer program product comprising one or more stored sequence of instruction that is accessible to a processor and which, when executed by the processor, causes the processor to carry out at least one of the steps of claim 1.

10. A non-transitory computer readable medium carrying one or more sequences of instructions of the computer program product of claim 9.

11. A non-transitory computer program product comprising one or more stored sequence of instruction that is accessible to a processor and which, when executed by the processor, causes the processor to carry out at least one of the steps of claim 8.

12. A method for determining the shape of the bevel of an ophthalmic lens so as to have the ophthalmic lens fit a given spectacle frame, the method comprising the steps of:
providing the three-dimensional (xi, yi, zi) internal profile of the groove of at least a rim of the spectacle frame expressed in the principal axes (Xf, Yf, Zf) of the spectacle frame and the length Pf of the periphery of the groove of the rim;
providing the blocking point of the ophthalmic lens and the horizontal direction Xl of the ophthalmic lens;
aligning the normal Zl to the surface of the ophthalmic lens at the blocking point with the Zf axe of the rim;
aligning the horizontal direction Xl of the ophthalmic lens with the Xf axe of the rim;

projecting the three-dimensional (xi, yi, zi) internal profile of the groove of the rim on the front face surface of the ophthalmic lens so as to obtain a three-dimension projected groove shape (xp, yp, zp); and modifying the coordinates of each point of the two-dimensional groove shape (xp, yp) based on two correction coefficient coefficients, Rx for the coordinate xp and Ry for the coordinate yp, with Rx+Ry=1 so as to have the length Pp of the three-dimensional groove projected shape (xp, yp, zp) equal to the length Pf of the periphery of the internal profile of the groove of the rim so as to obtain the shape of the bevel of the ophthalmic lens, wherein the modifying is performed iteratively based on the following equations:

$$X_{k+1} = X_k \times \left(1 + R_x \times \left[\frac{P_f - P_p}{Pf}\right]\right)$$

$$Y_{k+1} = Y_k \times \left(1 + R_y \times \left[\frac{P_f - P_p}{Pf}\right]\right).$$

* * * * *